Figure 3:
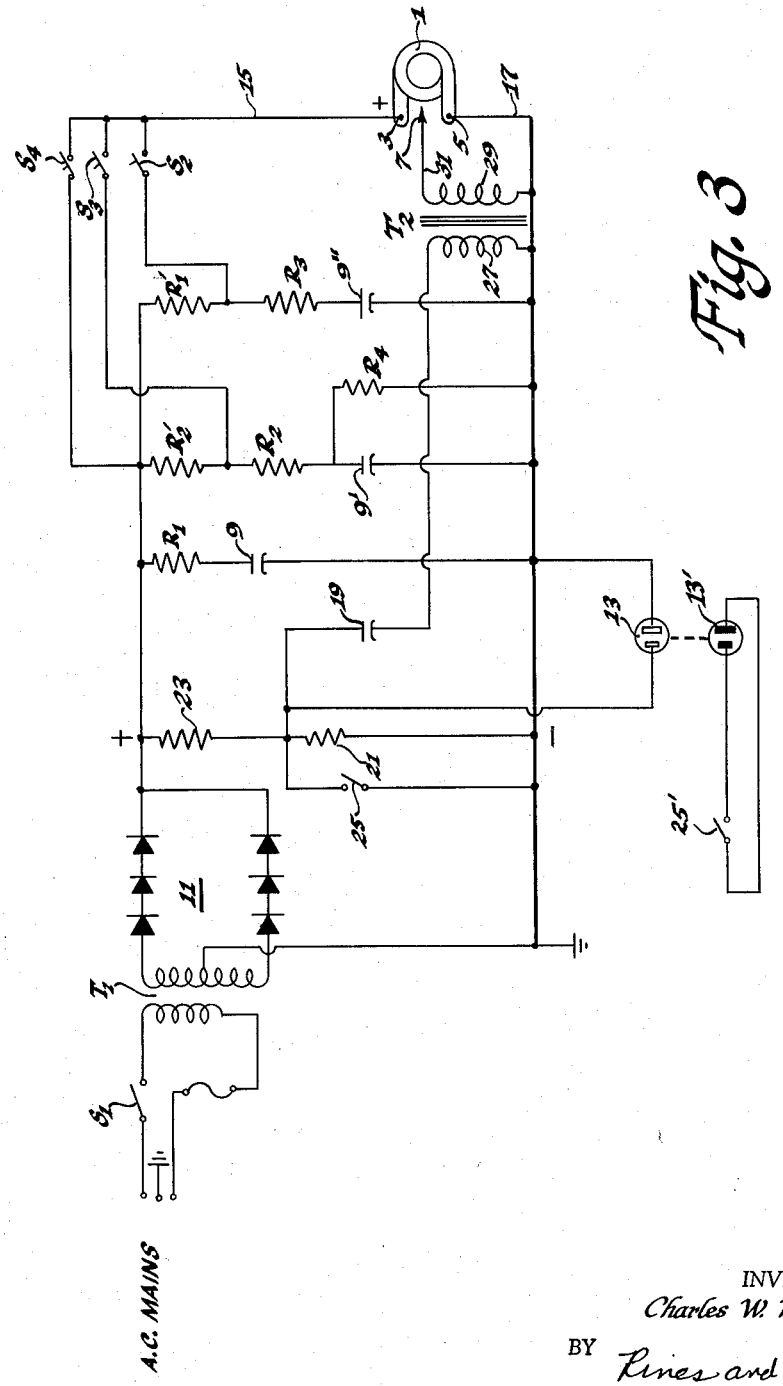

Sept. 26, 1961 C. W. WYCKOFF 3,001,459
METHOD OF AND APPARATUS FOR SENSITOMETRY
Filed Jan. 17, 1958 2 Sheets-Sheet 1
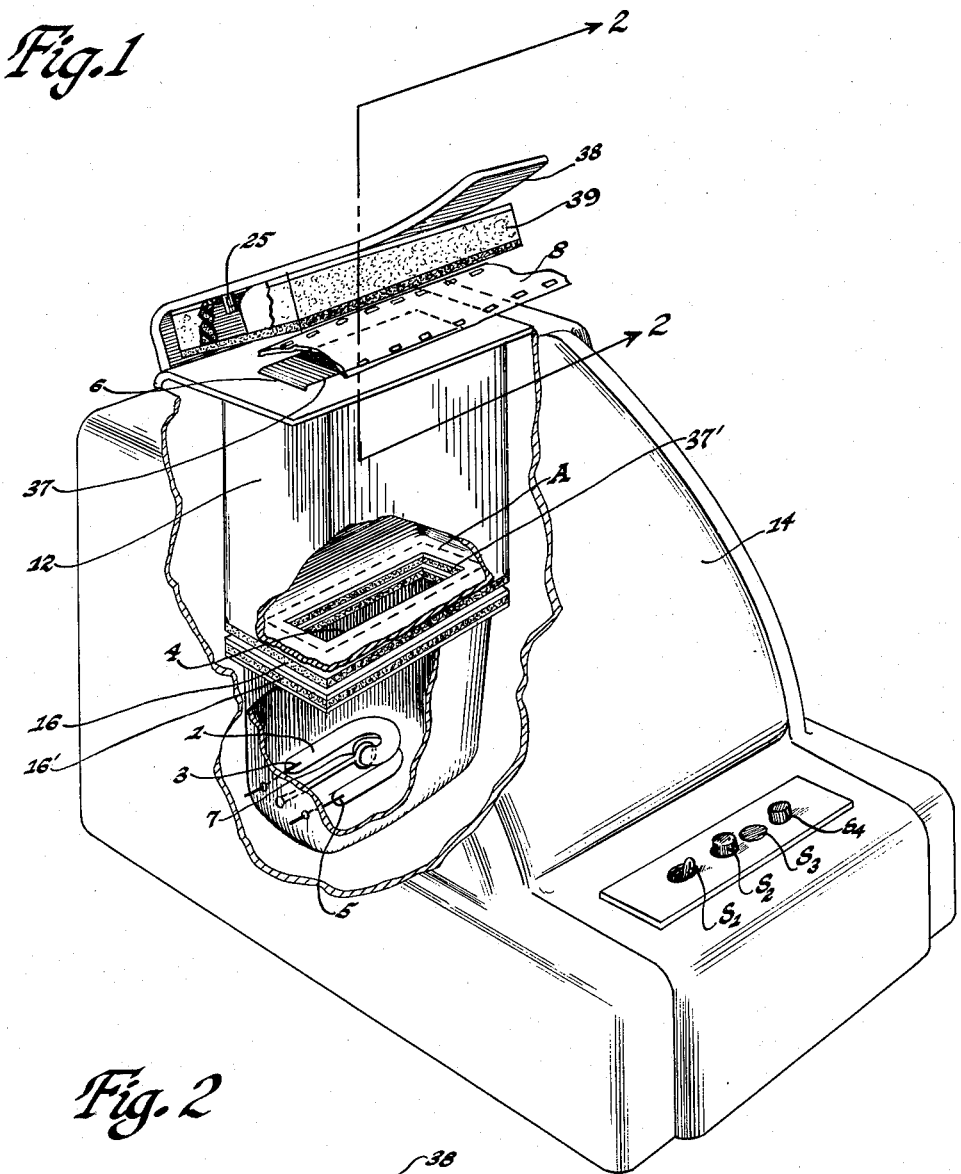
Fig.1
Fig.2
INVENTOR.
Charles W. Wyckoff
BY 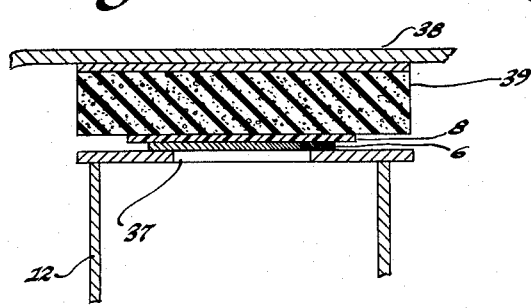
ATTORNEYS INVENTOR.
Charles W. Wyckoff
BY Rines and Rines
ATTORNEYS

United States Patent Office 3,001,459
Patented Sept. 26, 1961

3,001,459
METHOD OF AND APPARATUS FOR SENSITOMETRY
Charles W. Wyckoff, Needham, Mass., assignor to Edgerton, Germeshausen & Grier, Inc., Boston, Mass., a corporation of Massachusetts
Filed Jan. 17, 1958, Ser. No. 709,691
17 Claims. (Cl. 95—10)

The present invention relates to methods of and apparatus for sensitometry, and more particularly to the calibration of films by the determination of the density of developed films exposed to a given intensity of light, the determination of emulsion characteristics such as photographic speed, range of tone, contrast, color balance, fogging and age, and the effectiveness of the developer and the development method employed.

Films have heretofore been calibrated by exposing them to the light of a calibrated incandescent source, such as a tungsten-filament lamp. The light has customarily been passed from the calibrated incandescent source to the film through a calibrated shutter. The density of the developed film is then a measure of the response of that film to the light reaching it from the calibrated source. It is, however, extremely difficult to control the quantity of light obtained from the incandescent source and to control the spectral distribution of this light. This is because both the amount of light and the color of the light vary approximately as the fourth power of the voltage applied to the incandescent lamp. Transient variations in this voltage, as hereinafter discussed, produce very great changes not only in the quantity or intensity of the light but also in the color or spectral distribution of the light. This has the serious disadvantage of rendering inaccurate the calibration of film by such apparatus inasmuch as the calibration results obtained cannot be accurately reproduced from time to time. In addition, there is a marked change in both the quantity or intensity of the light and the color of the light caused by the evaporation of metal from the incandescent filament onto the walls of the lamp. This, too, prevents the calibration of films in a reproducible manner with successive uses of the incandescent source.

Flash lamps have therefore been proposed for the exposure of the film. The effect of transient voltage variations during the production of a flash of light is minimized by utilizing a light flash of duration sufficiently short to maintain the energy of each spectral component of the light flash substantially constant. The light from the flash may or may not be diffused and the film is exposed to the light flash preferably through areas of different optical densities. Since, in the case of flash lamps, the light output varies only as the square of the voltage, transient voltage variations during the production of the very short flash of light will not appreciably vary the light output. In addition, the color of the light produced from a flash lamp is nearly independent of the voltage, so that such voltage variations will not affect the color distribution of the light, either. Accurately reproducible results can, therefore, be obtained.

Such proposals, however, require complicated equipment, controls and adjustments and do not provide for flexibility in time duration of the flash that would enable determination of color balance in color films or contrast characteristic in black and white films, as later described.

An object of the present invention, accordingly, is to provide a new and improved method of and apparatus for flash sensitometry that shall not be subject to any of these disadvantages.

A further object of the present invention is to provide a new and improved film-calibrating method and system embodying electric flash lamps for producing momentary light flashes of calibrated different time durations to enable determination of color-film color balance and contrast characteristic in black and white film.

Other and further objects will be explained hereinafter, and will be more fully pointed out in the appended claims.

The invention will now be described in connection with the accompanying drawings, FIG. 1 of which is a perspective view, partly cut away to show details, of a preferred commercial embodiment of the invention;

FIG. 2 is a fragmentary longitudinal section taken along the line 2—2 of FIG. 1, looking in the direction of the arrows; and FIG. 3 is a schematic circuit diagram of a preferred electric circuit for operating the apparatus of FIGS. 1 and 2.

Referring to FIG. 1, a flash lamp is shown at 1, provided with a pair of principal electrodes 3 and 5, and an auxiliary trigger electrode 7. An electrical discharge is caused to pass between the principal electrodes 3 and 5 through the tube of the lamp 1 in response to the triggering or initiating action of the auxiliary electrode 7, shown in the form of a ring disposed about the envelope of the tube 1. The energy for producing the discharge is provided by any one of three storage capacitors 9, 9′, 9″, FIG. 3, that are connected to a common source of energy, shown as a selenium or similar rectifier system 11 coupled to the alternating-current mains, such as the standard 100 volt 60 cycle line, through a power transformer $T_1$. A mains switch $S_1$ connects the instrument to the mains. The upper terminal of the capacitor 9 is connected through resistors $R_1$—$R_1'$ and switch $S_2$, when closed, to conductor 15, which, in turn, connects with the principal anode electrode 3. The upper terminal of capacitor 9′ connects through resistors $R_2$—$R_2'$, and switch $S_4$, when operated to its closed position, to conductor 15, and through resistor $R_2$ and switch $S_3$, when closed, to the said conductor 15. The upper terminal of capacitor 9″ similarly connects through resistor $R_3$ and switch $S_2$, when closed, to conductor 15. The lower terminals of each of capacitors 9, 9′ and 9″ connect by conductor 17 to the cathode 5 of the flashtube 1. There is thus established between the electrodes 3 and 5, depending upon which of switches $S_2$, $S_3$ or $S_4$ is closed, a different predetermined voltage controlled by that accumulated by the respective capacitors 9, 9′ and 9″. These voltages, however, cannot of themselves discharge through the normally non-conductive tube 1. It is necessary, rather, to initiate the discharge of the voltage of any of the capacitors 9, 9′ or 9″ between the principal electrodes 3 and 5 by rendering the trigger electrode 7 positive with respect to one of the principal electrodes. A trigger circuit for effecting this result comprises a further storage capacitor 19 that is charged to a lesser voltage than the capacitors 9, 9′ or 9″, by virtue of its connection across a resistor 21. The resistor 21, together with a further series-connected resistor 23, forms a bleeder network for the source of energy 11. The voltage accumulated or stored by the capacitor 19 is used to initiate the discharge of voltage from any of the capacitors 9, 9′ or 9″ through the lamp 1 in response to the closing of a switch 25. When the switch 25 is closed, the voltage of the capacitor 19 rapidly discharges through the low-resistance discharge circuit comprising the closed switch 25 and the primary winding 27 of a trigger transformer $T_2$. The resulting voltage-discharge impulse is conveyed to the transformer secondary winding 29 and fed by a further conductor 31 to the trigger electrode 7, thereby rendering that electrode positive with respect to the principal cathode electrode 5. The high voltage of any of the capacitors 9, 9′ or 9″ becomes thereupon discharged through the tube between the principal electrodes 3 and 5, thereby to produce a momentary flash of light. The lamp 1 may be of the type illustrated, or of any other desired type such as, for example, those disclosed in U.S. Letters Patent 2,408,764, issued October 8, 1946, to Harold E. Edgerton. The trigger circuit, also, may not only assume the illustrated form, but it may be of any other desired type, such as those described in the said Letters Patent. As another example, a remote trigger-cable plug 13 may be provided for cooperation with a connector 13' associated with a remote trigger switching circuit 25'. The method underlying the present invention, thus, is independent of the particular apparatus shown.

In accordance with the present invention, this momentary flash of light from the flash lamp, is passed from the bottom well of the housing 14 through a neutral density or other filter 4, and thence preferably through a graded strip 6 comprising a medium having areas of different optical density, finally to impinge upon a film 8 that it is desired to calibrate. A Kodak No. 2 photographic 21-step tablet graded strip 6 may be used, for example, having step ranges in density from 0.05 to 3.05 in increments of approximately 0.15. In accordance with the invention, the graded-strip tablet 6 is placed over an exposure window 37 in the top support surface of a removable scale box 12, the periphery of the exposure window 37' in the bottom surface of which may be lined with soft rubber and the like, as at 16, to seal against a corresponding lining 16' about the apertured protective cover of the well containing the flash lamp 1. A light-tight seal is thus achieved when the scale box 12 is in place. The film 8 is thus exposed to the light of the flash lamp 1 that may previously be calibrated, for example, with the aid of a suitable light meter, such as that disclosed in the U.S. Letters Patent 2,588,368, issued March 11, 1952, to the said Harold E. Edgerton, through a diffusing glass in a darkened chamber, not shown. The series of calibrated density areas of the graded strip 6, if used, will produce a number of different exposure densities on the film 8, enabling the determination of the contrast to which the film has been developed. Two different types of film exposed under the same light conditions with the light of the same calibrated flash lamp, will, upon measurement, show different densities. These densities will, therefore, serve as a measure of the different responses of the films to the same amount of light. The time duration of the flash of light produced by the flash lamp 1 may be varied in fixed pre-calibrated amounts by closing the successive switches $S_2$, $S_3$ and $S_4$. The switches $S_1$, $S_2$, $S_3$ and $S_4$ may all be conveniently mounted in a front keyboard, as shown in FIG. 1. Capacitors 9 and 9' of 250 μfd. and a capacitor 9" of 10 μfd., together with resistors $R_1$ and $R_2'$ of 50 ohms, resistor $R_2$ of 2 ohms, resistor $R_4$ of 150K ohms shunting capacitor 9', resistor $R_1'$ of 3.3K ohms and resistor $R_3$ of 4 ohms, for example, will provide time constants that produce a one-hundredth of a second flash of tube 1 when switch $S_4$ is closed, a one-thousandth of a second flash when switch $S_3$ is closed and a one-ten thousandth of a second flash when switch $S_2$ is closed. The one-thousandth of a second flash is preferably the most powerful giving, for example, an output of 5700 meter-candle-seconds. The corresponding values for the one-hundredth and one ten-thousandth of a second flashes are preferably of the order of 1100 and 50 meter-candle-seconds, respectively. Apart from the control of the flash intensity by the voltage developed across the capacitors, by utilizing various different density filters 4, or by varying the area of light transmission through the filter 4, as with the aid of suitable apertures or masks, further intensity control may be achieved. The color of the light may also be regulated by utilizing different types of filters 4.

It is now in order to explain how the use of the flash lamp without a shutter in this apparatus obviates the before-mentioned difficulties attendant upon the use of tungsten and other incandescent light sources with calibrated shutters and why greater accuracy is obtained in the measurement of the sensitivity of a film to a known quantity of light of predetermined spectral distribution. As before stated, voltage variations with incandescent lamps change not only the color but also the intensity of the light from the lamps and forbid the production of reproducible results each time a film is calibrated. As an illustration, a drop in line voltage of 10 percent will shift the color temperature of a tungsten lamp at, for example, 5500 Angstroms light wavelength, from about 3200° K. to about 2400° K. Similarly, should the line voltage increase 10 percent, the shift in color temperature at this wavelength may be from about 3200° K. to about 4000° K. A change in voltage of about 10 percent, moreover, will produce a change of about 400 percent in the total energy content of a particular band of light received by the film. Such several-hundred percent changes in the energy of the light for a variation of only ten percent in the line voltage are extremely undesirable. This is particularly so in the case of the calibration of color films. Shifts of such great proportions in the color temperature of the light, which are really shifts of large percentages in the actual energy content of each spectral component of the light from the lamp, prevent accurate and reproducible calibration of color film. The same disadvantages obtain, also, in the case of black and white film, though they are not quite so serious as in the case of color film. In addition to such tremendous shifts in color temperature or in the energy content of the spectral components of the light, the use of the incandescent lamp produces other undesirable changes in the spectral energy distribution as the result of the before-mentioned sputtering of the metal of the incandescent filament upon the glass or other walls of the incandescent lamp. The light output, furthermore, as before indicated, varies as the fourth power of the voltage, so that a very appreciable change in the total light intensity occurs, also, in response to a small variation in the line voltage.

In the system of FIG. 1, on the other hand, wherein a flash lamp is utilized as the source of light, transient line-voltage variations will produce almost negligible effects in both the quantity or intensity of light emitted by the light source and in the spectral distribution of the light energy. It has been found, for example, that changes of less than 20 percent in the energy of the spectral components of the light from the flash lamp occur for a change in the flash-lamp voltage of the before-mentioned 10 percent. This, of course, is quite negligible as compared with the previously described several-hundred percent change, and, for all practical purposes, the energy of the spectral components may be considered substantially constant. In actual practice, moreover, while the line voltage may vary as much as 10 percent, as for example, where the source of energy 11 is a rectifier cooperating with alternating current mains, such a 10 percent change, unlike in the case of the incandescent lamp, does not actually take place in the flash-producing circuit. This is because the charges upon the capacitors 9, 9', 9" are not appreciably affected by transient variations in the source 11 in view of the very much greater time period or time constant of the capacitor-charging circuit than the time period or duration of the transient variation. A 10-percent variation in mains voltage would thus not even produce a 10-percent variation in the voltage operating upon the flash lamp. Even if, moreover, an enormous change in mains voltage was produced such that as much as a 10-percent variation in voltage was reflected in the flash-lamp discharge circuit, as before stated, the spectral energy of the flash of light still remains substantially constant as compared with several-hundred percent changes in the case of the incandescent lamps. There is also the further factor, before-mentioned, that in the case of the flash lamps there is negligible sputtering of electrode material, and the light output varies only as the square of the voltage, this latter factor serving further to reduce the variation of the light output of the flash lamp in response to transient voltage variations in the flash-producing circuit.

With the aid of the flash-producing sensitometry system, therefore, films may be calibrated with substantially the same reproducible results over long periods of time. The duration of the discharge of the flash lamp, moreover, is short compared to the charging time of the capacitor 9 so that the discharge, also, is unaffected by the transient variations in the voltage.

Among the further advantages of the construction of the present invention over prior flash sensitometers, furthermore, is the range of light intensities provided by the switch-controlled discharge circuits $S_2$, $S_3$, $S_4$, above-discussed, which range is sufficient to test both slow emulsions, such as enlarging paper, and fast emulsions, such as high-speed panchromatic film and color film. A flashtube 1 of the type before mentioned, moreover, emits light approximately the color quality of daylight, and requires no color compensation. For processing control, one would choose that flash duration, by selecting the appropriate switch $S_2$, $S_3$ or $S_4$, that most closely approximates the exposure given the film to be processed. Compensatory attenuator strips, shown dotted at A, may also readily be inserted anywhere between the flashtube 1 and the photosensitive emulsion of the film 8 to equalize the light output from the different duration flashes, if desired. With appropriate variable area filters 4, moreover, the output of the one-hundredth of a second flash (switch $S_4$) and the output of the one-thousandth of a second flash (switch $S_3$) may be reduced to correspond to that of the one-ten thousandth of a second flash. Comparison of three different flash-exposure durations of the same total light exposure may thus be effected to provide for testing of photosensitive emulsions for reciprocity failure. Color balance of the film may thus be easily checked. In the case of black and white films, developing with successively different developing times will permit one to obtain the same contrast with a short flash as with the longer standard one-hundredth of a second flash, again providing for determination of the film characteristics.

In accordance with the preferred embodiment of the invention, moreover, simple, precise flash exposure is effected automatically when all the apparatus is properly assembled and light-sealed by causing a top pivoted handle 38 carrying a resilient platten 39, as of foam rubber and the like, to carry the trigger switch button 25 in the region of the handle between the platten 39 and the hinged region thereof. Only when the film 8 and graded strip 6 are in position and light-sealed by the pressure of the platten 39, and when the shield box 12 is also thereby pressed tightly against the light-sealing surface 16', will the trigger switch 25 be automatically operated to produce the required flash.

Further modifications will occur to those skilled in the art and all such are considered to fall within the spirit and scope of the present invention as defined in the appended claims.

What is claimed is:

1. A film calibration apparatus having, in combination, an electric flash lamp provided with a pair of principal electrodes between which an electrical discharge may pass to produce a flash of light, a film support spaced from the flash lamp in the path of the light produced thereby, a member having a plurality of areas of different optical densities supported at the film support, means for light-sealing a film to the said member at the film support with the said member interposed between the flash lamp and the film, and means controlled upon the sealing by the light-sealing means for initiating an electrical discharge between the principal electrodes to produce a flash of light that effects the momentary exposure of the film on the film support through the said plurality of areas of different optical densities.

2. A film calibration apparatus having, in combination, an electric flash lamp provided with a pair of principal electrodes between which an electrical discharge may pass to produce a flash of light, a film support spaced from the flash lamp in the path of the light produced thereby, a member having a plurality of areas of different optical densities supported at the film support, means for light-sealing a film to the said member at the film support with the said member interposed between the flashlamp and the film, means controlled upon the sealing by the light-sealing means for initiating an electrical discharge between the principal electrodes to produce a flash of light that effects the momentary exposure of the film on the film support through the said plurality of areas of different optical densities, and means for changing the duration of the said flash of light to a plurality of different predetermined flash-duration values.

3. Apparatus as claimed in claim 2 and in which means is provided for substantially equalizing the total light output of the different-duration flashes.

4. A film calibration apparatus having, in combination, an electric flash lamp provided with a pair of principal electrodes between which an electrical discharge may pass to produce a flash of light, a film support spaced from the flash lamp in the path of the light produced thereby, a member having a plurality of areas of different optical densities supported at the film support, a filter supported in the said path between the said member and the flash lamp, means for light-sealing a film to the said member at the film support with the said member interposed between the flash lamp and the film, and means controlled upon the sealing by the light-sealing means for producing an electrical discharge between the principal electrodes to produce a flash of light that effects the momentary exposure of the film on the film support through the said plurality of areas of different optical densities.

5. A film calibration apparatus having, in combination, an electric flash lamp provided with a pair of principal electrodes between which an electrical discharge may pass to produce a flash of light and an auxiliary electrode for initiating the discharge, a source of voltage connected between the principal electrodes for supplying energy for the discharge, a film support spaced from the flash lamp in the pash of the light produced thereby, a member having a plurality of areas of different optical densities supported in the said path between the flash-lamp and the film support, a trigger circuit connected with the auxiliary electrode, means for light-sealing a film to the said member at the film support, and means controlled upon the sealing by the light-sealing means for operating the trigger circuit to initiate the discharge of the energy of the source between the principal electrodes to produce a flash of light that effects the momentary exposure of the film on the film support through the said plurality of areas of different optical densities.

6. A film calibration apparatus having, in combination, an electric flash lamp provided with a pair of principal electrodes between which an electrical discharge may pass to produce a flash of light and an auxiliary electrode for initiating the discharge, a source of voltage connected between the principal electrodes for supplying energy for the discharge, a film support spaced from the flash lamp in the path of the light produced thereby, a member having a plurality of areas of different optical densities supported in the said path between the flash-lamp and the film support, a trigger circuit connected with the auxiliary electrode, means for light-sealing a film to the said member at the film support with the said member interposed between the flash lamp and the film, means controlled upon the sealing by the light-sealing means for operating the trigger circuit to initiate the discharge of the energy of the source between the principal electrodes to produce a flash of light that effects the momentary exposure of the film on the film support through the said plurality of areas of different optical densities, and means for changing the duration of the said flash of light to a plurality of different predetermined flash-duration values.

7. A film calibration apparatus having, in combination, a light-tight housing provided with an electric flash lamp supported within the bottom of the housing and provided with a pair of principal electrodes between which an electrical discharge may pass to produce a flash of light and an auxiliary electrode for initiating the discharge, a source of voltage connected between the principal electrodes for supplying energy for the discharge, a removable box having top and bottom openings and disposed at the top of the housing for supporting a film over the top opening, a member having a plurality of areas of different optical densities supported in contact with a film supported on the film support, a light-tight cover adapted to fit over the film and member on the film support, a trigger circuit connected with the auxiliary electrode, and switching means controlled by the light-tight cover when in fitted position for operating the trigger circuit to initiate the discharge of the energy of the source between the principal electrodes to produce a flash of light that effects the momentary exposure of a film on the film support to a flash of light through the said plurality of areas of different optical densities.

8. A film calibration apparatus having, in combination, a light-tight housing provided with an electric flash lamp supported within the bottom of the housing and provided with a pair of principal electrodes between which an electrical discharge may pass to produce a flash of light and an auxiliary electrode for initiating the discharge, a source of voltage connected between the principal electrodes for supplying energy for the discharge a removable box having top and bottom openings and disposed at the top of the housing for supporting a film over the top opening, a member having a plurality of areas of different optical densities supported in contact with a film supported on the film support, a light-tight cover adapted to fit over the film and member on the film support, a trigger circuit connected with the auxiliary electrode, switching means controlled by the light-tight cover when in fitted position for operating the trigger circuit to initiate the discharge of the energy of the source between the principal electrodes to produce a flash of light that effects the momentary exposure of a film on the film support to a flash of light through the said plurality of areas of different optical densities, and means for changing the duration of the said flash of light to a plurality of different predetermined flash-duration values.

9. Apparatus as claimed in claim 8 and in which attenuator means is provided for substantially equalizing the total light output of the different-duration flashes.

10. Apparatus as claimed in claim 8 and in which attenuator means is provided for altering the spectral composition of the light exposing the film.

11. A method of exposing a film for purposes of determining its characteristics that comprises storing energy that is subject to transient variations over a period of time long compared with the duration of the transient variation, converting the stored energy at successive times into successive light flashes of different predetermined duration the energy of each spectral component of which is substantially constant, exposing the film to the successive light flashes of different duration through a plurality of areas of different optical densities, processing the film to render visible the exposures of the film by each of the successive light flashes, and comparing the densities of the exposures of the processed film to determine exposure reciprocity effects.

12. A method of exposing a film for purposes of determining its characteristics that comprises storing energy that is subject to transient variations over a period of time long compared with the duration of the transient variations, converting the stored energy at successive times into successive light flashes of different predetermined duration the energy of each spectral component of which is substantially constant, altering the spectral composition of the light flashes, exposing the film to the successive light flashes of different duration through a plurality of areas of different optical densities, processing the film to render visible the exposures of the film by each of the successive light flashes, and comparing the densities of the exposures of the processed film to determine exposure reciprocity effects.

13. A method of exposing a film for purposes of determining processing characteristics that comprises storing energy that is subject to transient variations over a period of time long compared with the duration of the transient variations, converting the stored energy at successive times into successive light flashes of substantially the same predetermined duration the energy of each spectral component of which is substantially constant, exposing the film to the successive light flashes through a plurality of areas of different optical densities, processing the film to render visible the exposures of the film by each of the successive light flashes, and comparing the densities of the exposures of the processed film to determine the effects of processing.

14. A method of exposing a film for purposes of determining processing characteristics that comprises storing energy that is subject to transient variations over a period of time long compared with the duration of the transient variations, converting the stored energy at successive times into successive light flashes of substantially the same predetermined duration the energy of each spectral component of which is substantially constant, altering the spectral composition of the light flashes, exposing the film to the successive light flashes through a plurality of areas of different optical densities, processing the film to render visible the exposures of the film by each of the successive light flashes, and comparing the densities of the exposures of the processed film to determine the effects of processing.

15. A method of exposing a color film for purposes of determining its characteristics that comprises storing energy that is subject to transient variations over a period of time long compared with the duration of the transient variations, converting the stored energy at successive times into successive flashes of different predetermined duration the energy of each spectral component of which is substantially constant, exposing said film to the successive light flashes of different duration through a plurality of areas of different optical densities, processing said film to render visible the exposures of the film by each of the successive light flashes, and comparing the densities of the exposures of the developed film to determine exposure reciprocity effects and color balance.

16. A method of exposing a color film for purposes of determining processing characteristics that comprises storing energy that is subject to transient variations over a period of time long compared with the duration of the transient variations, converting the stored energy at successive times into successive light flashes of substantially the same predetermined duration the energy of each spectral component of which is substantially constant, exposing said film to the successive light flashes through a plurality of areas of different optical densities, processing said film to render visible the exposures of the film by each of the successive light flashes, and comparing the densities of the exposures of the processed film to determine the effects of processing.

17. A method of exposing a color film for purposes of determining processing characteristics that comprises storing energy that is subject to transient variations over a period of time long compared with the duration of the transient variations, converting the stored energy at successive times into successive light flashes of substantially the same predetermined duration the energy of each spectral component of which is substantially constant, altering the spectral composition of the light flashes, exposing said film to the successive light flashes through a plurality of areas of different optical densities, processing said film to render visible the exposures of the film by each of the successive light flashes, and comparing the densities of the exposures of the processed film to determine the effects of processing.

References Cited in the file of this patent

UNITED STATES PATENTS

| | | | |
|---|---|---|---|
| Re. 22,611 | Edgerton | Mar. 6, | 1945 |
| 1,361,349 | Rennick | Dec. 7, | 1920 |
| 1,832,294 | Gent | Nov. 17, | 1931 |
| 2,408,764 | Edgerton | Oct. 8, | 1946 |
| 2,762,278 | Sweet | Sept. 11, | 1956 |